(12) United States Patent
Guo (10) Patent No.: US 10,643,047 B2
(45) Date of Patent: May 5, 2020

(54) BIOMETRIC MODULE AND MOBILE TERMINAL

(71) Applicant: SHENZHEN GOODIX TECHOLOGY CO., LTD., Shenzhen, Guangdong (CN)

(72) Inventor: Yiping Guo, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 78 days.

(21) Appl. No.: 16/168,513

(22) Filed: Oct. 23, 2018

(65) Prior Publication Data

US 2019/0057242 A1 Feb. 21, 2019

Related U.S. Application Data

(63) Continuation of application No. PCT/CN2017/082232, filed on Apr. 27, 2017.

(51) Int. Cl.
| | |
|---|---|
| *G06K 9/00* | (2006.01) |
| *G06F 21/32* | (2013.01) |
| *G06K 9/62* | (2006.01) |
| *H04M 1/02* | (2006.01) |
| *H04M 1/725* | (2006.01) |

(52) U.S. Cl.
CPC ......... *G06K 9/00006* (2013.01); *G06F 21/32* (2013.01); *G06K 9/62* (2013.01); *H04M 1/026* (2013.01); *G06F 2203/04103* (2013.01); *H04M 1/0283* (2013.01); *H04M 1/72577* (2013.01); *H04M 2250/12* (2013.01)

(58) Field of Classification Search
None
See application file for complete search history.

(56) References Cited

U.S. PATENT DOCUMENTS

| | | | |
|---|---|---|---|
| 10,440,164 B2* | 10/2019 | Yu | G06F 1/1637 |
| 2015/0071509 A1* | 3/2015 | Myers | G06K 9/0002 |
| | | | 382/124 |
| 2017/0364763 A1* | 12/2017 | Jin | G06F 21/32 |

(Continued)

FOREIGN PATENT DOCUMENTS

| | | |
|---|---|---|
| CN | 104182738 A | 12/2014 |
| CN | 204759553 U | 11/2015 |

(Continued)

OTHER PUBLICATIONS

Extended European Search Report for European Patent Application No. 17905905.0 dated Aug. 22, 2019.

*Primary Examiner* — Duane N Taylor, Jr.
(74) *Attorney, Agent, or Firm* — Heslin Rothenberg Farley & Mesiti P.C.

(57) ABSTRACT

A biometric module and a mobile terminal, are provided. The biometric module includes: a flexible circuit board, a biological detection component installed on a first surface of the flexible circuit board, a stiffening plate fixed on a second surface of the flexible circuit board and a decorative ring arranged around the biological detection component. The decorative ring has a first supporting surface, and the biological detection component is fixed on the first supporting surface. The decorative ring further has a second supporting surface for being fixed with an edge region of an opening.

16 Claims, 10 Drawing Sheets

(56) References Cited

U.S. PATENT DOCUMENTS

2018/0293420 A1* 10/2018 Kim .................... H04M 1/0277
2019/0208043 A1*  7/2019 Cha ........................ H04M 1/02
2020/0057467 A1*  2/2020 Kim .................... G06K 9/0002

FOREIGN PATENT DOCUMENTS

| CN | 105825165 A | 8/2016 |
| CN | 106066673 A | 11/2016 |
| CN | 106293239 A | 1/2017 |
| CN | 106599791 A | 4/2017 |

* cited by examiner

BIOMETRIC MODULE AND MOBILE TERMINAL

CROSS REFERENCE TO RELATED APPLICATIONS

This disclosure is a continuation of International Application No. PCT/CN2017/082232, filed on Apr. 27, 2017, which application is hereby incorporated by reference herein, in its entirety.

TECHNICAL FIELD

This disclosure relates to the field of biometric technologies, and particularly, to a biometric module and a mobile terminal.

BACKGROUND

In recent years, a biometric sensor has developed rapidly, and the most typical one is a fingerprint identification sensor, which has been commonly applied to people's daily lives, for example, fingerprint unlocking and fingerprint payment applied to mobile terminal devices, punching a card through a fingerprint at work and the like. Meanwhile, technical update of the mobile terminal device comprising the fingerprint identification sensor is also very rapid, e.g., increase of volume of a front-facing camera, increase of size proportion of a touch and display region, three-dimensional (3D) curved surface design, an Organic Light-Emitting Diode (OLED) display screen assembling mode and the like.

Figure 1:
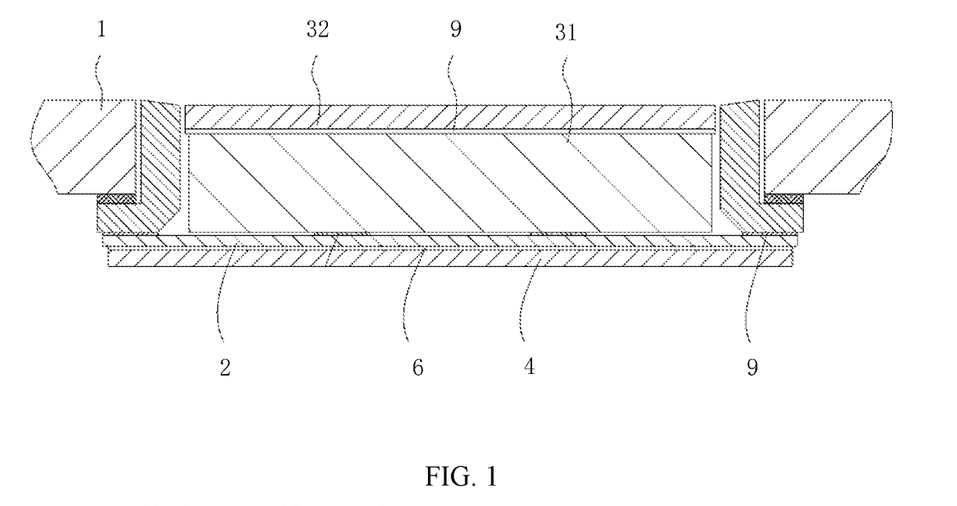
FIG. 1 is a structural schematic diagram of a biometric module according to the existing art.

The inventor finds that the existing art at least has the following problems: FIG. 1 shows a structure and an assembling solution of an existing fingerprint module, however, the assembling solution is no longer applicable with the technical update of the mobile terminal device having the fingerprint identification sensor. For example, the size proportion of the touch and display region of an OLED display screen is increased such that a space reserved for a structural design size of the fingerprint module is reduced, resulting in interference between a wire outlet end of the OLED display screen and a stacking space of the fingerprint module structure, and thus, the existing fingerprint module and assembling mode are not applicable any more. In order to match with development of the mobile terminal device, the structural design and the assembling mode of the fingerprint module also need to be changed accordingly.

SUMMARY

Some embodiments of this disclosure are to provide a biometric module and a mobile terminal, and provide a specific structure of an ultrathin biometric module and an assembling mode of fixing the ultrathin biometric module to the mobile terminal, so that a certain space can be reserved for a display screen with a large-sized display region for use, without spatial interference with a wire outlet end of the display screen.

An embodiment of this disclosure provides a biometric module applied to a mobile terminal. The mobile terminal includes a transparent cover plate having an opening for accommodating the biometric module; the biometric module has a thickness smaller than or equal to a thickness of the transparent cover plate, and the biometric module includes: a flexible circuit board, a biological detection component installed on a first surface of the flexible circuit board, a stiffening plate fixed on a second surface of the flexible circuit board and a decorative ring arranged around the biological detection component; the decorative ring has a first supporting surface, and the biological detection component is fixed on the first supporting surface; and the decorative ring further has a second supporting surface for being fixed with an edge region of the opening.

An embodiment of this disclosure further provides a mobile terminal, including: the above-mentioned biometric module, a shell and a transparent cover plate with an opening; the biometric module is positioned in the opening, and the second supporting surface of the decorative ring is fixed with an edge region of the opening; and the transparent cover plate is fixed on the shell.

An embodiment of this disclosure further provides another biometric module, applied to a mobile terminal including a transparent cover plate. The transparent cover plate has an opening for accommodating the biometric module and the inner wall of the opening extends to form a supporting table; a thickness of the biometric module is smaller than or equal to a thickness of the transparent cover plate, and the biometric module includes: a flexible circuit board, a biological detection component installed on a first surface of the flexible circuit board and a stiffening plate fixed on a second surface of the flexible circuit board; and the biological detection component is fixed on the supporting table.

An embodiment of this disclosure further provides a mobile terminal, including: the above-mentioned biometric module and a transparent cover plate with an opening; and the inner wall of the opening extends to form a supporting table, and the biological detection component is positioned in the opening and fixed on the supporting table.

The embodiments of this disclosure, compared to the existing art, provide the specific structure of the ultrathin biometric module and the assembling manner of fixing the ultrathin biometric module to the mobile terminal, so that a certain reserved space can be reserved to be matched with the display screen with the large-sized display region for use, without spatial interference with the wire outlet end of the display screen.

In addition, in a biometric module, a ring-shaped inner skirt is formed on the inner side wall of the decorative ring; and the upper surface of the inner skirt forms the first supporting surface, and the lower surface of the biological detection component is fixed with the first supporting surface. The embodiment provides a specific fixing manner of the decorative ring and the biological detection component.

In addition, in a biometric module, a ring-shaped outer skirt is formed on the outer side wall of the decorative ring; and the lower surface of the outer skirt forms the second supporting surface, and the second supporting surface is used for being fixed with an edge region of the opening, which is positioned at the upper surface of the transparent cover plate. The embodiment provides a specific fixing manner of the decorative ring and the transparent cover plate.

In addition, in a biometric module, the lower surface of the inner skirt is fixedly connected with the stiffening plate; and at least one fixing part for being matched with a fixed structure of the mobile terminal is installed on the stiffening plate so as to fix the biometric module in the mobile terminal. The embodiment provides a preferred implementation manner of fixing the biometric module to the mobile terminal, so that the biometric module can be more firmly fixed.

In addition, in a biometric module, the lower surface of the decorative ring is provided with at least two fixing parts for being matched with the fixed structure of the mobile terminal so as to fix the biometric module in the mobile terminal. The embodiment provides another preferred implementation manner of fixing the biometric module to the mobile terminal, so that the biometric module can be more firmly fixed.

In addition, in a biometric module, the outer skirt is formed on part of the outer side wall of the decorative ring; the upper surface of the outer skirt forms the second supporting surface, and the second supporting surface is used for being fixed with an edge region of the opening, which is positioned at the lower surface of the transparent cover plate; and the lower surface of the outer skirt is used for being in contact with a shell of the mobile terminal. The embodiment provides another specific fixing manner of the decorative ring and the transparent cover plate.

In addition, in one biometric module, the upper surface of the decorative ring forms the first supporting surface, and the lower surface of the biometric module is fixed with the first supporting surface; and the outer skirt is formed on part of the outer side wall of the decorative ring, the upper surface of the outer skirt forms the second supporting surface, and the second supporting surface is used for being fixed with the edge region of the opening, which is positioned at the lower surface of the transparent cover plate. The embodiment provides another structure of a decorative ring and a fixing mode of the decorative ring and the transparent cover plate of the mobile terminal.

In addition, in a biometric module, the second supporting surface is a plane or an oblique plane. The embodiment provides a specific form of the second supporting surface.

In addition, in a biometric module, the fixing part is a nut, and the fixed structure includes a positioning plate fixed to the case of the mobile terminal and a screw which is used for passing through the positioning plate and locked to the nut. The embodiment provides a specific implementation manner of the fixing part.

In addition, in a biometric module, the biological detection component includes a biometric sensor and a protective cover plate; the protective cover plate is fixed to the biometric sensor, and the biometric sensor is installed on a first surface of the flexible circuit board; and the lower surface of the protective cover plate is fixed with the first supporting surface, or the lower surface of the biometric sensor is fixed with the first supporting surface. The embodiment provides a specific structure of the biological detection component, and fixing modes of two types of biological detection components and the first supporting surface.

In addition, in one biometric module, a thickness range of the biometric sensor is 90 to 350 μm.

In addition, in one biometric module, the biometric sensor is a fingerprint identification sensor.

In addition, in another biometric module, the biological detection component includes a biometric sensor and a protective cover plate; the protective cover plate is fixed to the biometric sensor, and the biometric sensor is installed on the first surface of the flexible circuit board; and the lower surface of the protective cover plate is fixed on the supporting table, or the lower surface of the biometric sensor is fixed on the supporting table. The embodiment provides a specific structure of the biological detection component, and fixing manners of two types of biological detection components and the supporting table.

In addition, one mobile terminal further includes two sealing rings; one sealing ring is clamped between the first supporting surface and the biological detection component; and the other sealing ring is clamped between the second supporting surface and the edge region of the opening, or the other sealing ring is clamped between the decorative ring and the inner wall of the opening. In the embodiment, the sealing rings are arranged in the mobile terminal to form a waterproof structure, so that the mobile terminal has a waterproof function.

In addition, another mobile terminal further includes an adhesive layer; and the adhesive layer is filled in a gap between the supporting table and the biometric module. In the embodiment, the gap between the supporting table and the biometric module is filled with the adhesive layer so as to more reliably fix the biometric module in the mobile terminal.

In addition, in another mobile terminal, the lower surface of the biological detection component is fixed with the upper surface of the supporting table; and the mobile terminal further includes the sealing ring, and the sealing ring is clamped between the lower surface of the biological detection component and the upper surface of the supporting table. In the embodiment, the sealing ring is arranged in the mobile terminal to form a waterproof structure, so that the mobile terminal has a waterproof function.

BRIEF DESCRIPTION OF THE DRAWINGS

One or more embodiments are exemplarily illustrated by figures in the corresponding accompanying drawings, those exemplary illustrations do not constitute limitation to the embodiments, and components with the same reference signs in the accompanying drawings represent similar components; unless specified otherwise, the figures in the accompanying drawings do not constitute proportional limitation.

DETAILED DESCRIPTION

In order to make objects, technical solutions and advantages of this disclosure more apparent, some embodiments of this disclosure will be further illustrated in detail in connection with the accompanying drawings and the embodiments. It should be understood that specific embodiments described herein merely are used for explaining this disclosure, and not intended to define this disclosure.

A first embodiment of this disclosure relates to a biometric module, with reference to FIG. 2a, FIG. 2b, FIG. 3a and FIG. 3b. The biometric module of the embodiment is applied to the mobile terminal, e.g., a mobile phone, a tablet personal computer and the like. The mobile terminal includes a transparent cover plate 1, the transparent cover plate 1 has an opening for accommodating the biometric module. The transparent cover plate 1 is a display touch panel or a case of the mobile terminal, and in the drawings, the reference numeral 13 represents a middle frame of the mobile terminal. A thickness of the biometric module is smaller than or equal to a thickness of the transparent cover plate 1, and the biometric module includes a flexible circuit board 2, a biological detection component, a stiffening plate 4 and a decorative ring 5.

The biological detection component is installed on a first surface of the flexible circuit board 2, the biological detection component can be installed on the first surface of the flexible circuit board 2 by soldering, and in the drawings, the reference numeral 21 represents soldering, but the embodiment does not make any limit thereto.

The stiffening plate 4 is fixed on a second surface of the flexible circuit board 2, the stiffening plate 4 and the flexible circuit board 2 can be fixed by a conductive adhesive 6, but the embodiment does not make any limit thereto.

The decorative ring 5 is arranged around the biological detection component and has a first supporting surface and a second supporting surface. The biological detection component is fixed on the first supporting surface, and the second supporting surface of the decorative ring 5 is used for being fixed with an edge region of the opening.

A ring-shaped inner skirt 51 is formed at the inner side wall of the decorative ring 5, an upper surface of the inner skirt 51 forms the first supporting surface, and the lower surface of the biological detection component is fixed with the first supporting surface. A lower surface of the inner skirt 51 is fixedly connected with the stiffening plate 4, and specifically by a laser welding technology, but the embodiment is not limited thereto.

Preferably, a fixing part 41 for being matched with a fixed structure of the mobile terminal can also be installed on the stiffening plate 4, and compared to a case of fixing the biometric module with the mobile terminal only by the decorative ring 5, it has a better effect and is firmer. The fixing part 41 can be installed at the center of the stiffening plate 4 so as to form a better fixing effect, but the embodiment does not make any limit thereto.

In the embodiment, a plurality of fixing parts 41 can also be installed on the stiffening plate 4, the plurality of fixing parts 41 are uniformly distributed, but the embodiment does not make any limit thereto, and the specific number and actual positions of the fixing parts can be decided according to a position of a reserved space required when a display screen is assembled, i.e., the fixing parts are assembled at positions where interference cannot occur between the fixing parts and the display screen.

In the embodiment, the fixing part 41 can be a nut, and the fixed structure includes a positioning plate 7 fixed to a shell of the mobile terminal and a screw 8 which is used for passing through the positioning plate 7 and locked to the nut. Particularly, an opening is formed on the positioning plate 7 of the case of the mobile terminal, the fixing part 41 on the stiffening plate 4 is the nut, the screw 8 passes through the positioning plate 7 and is locked on the nut to fix the positioning plate 7 and the stiffening plate 4, so as to fix the biometric module on the mobile terminal.

It should be noted that in the embodiment, the biometric module can also be fixed in the mobile terminal by an outer skirt 52 of the decorative ring 5 and the transparent cover plate 1, without the fixing part 41 on the stiffening plate 4. But the embodiment does not make any limit thereto. However, the fixing part 41 is better to install on the stiffening plate 4 generally, which is relatively firm.

Figure 2A:
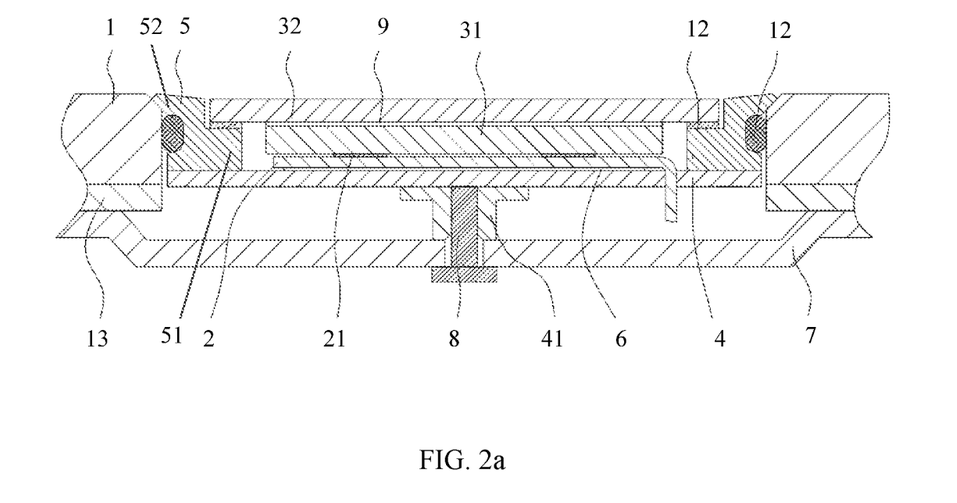
FIG. 2a is a schematic diagram of a first structure of a biometric module according to a first embodiment of this disclosure.
Figure 2B:
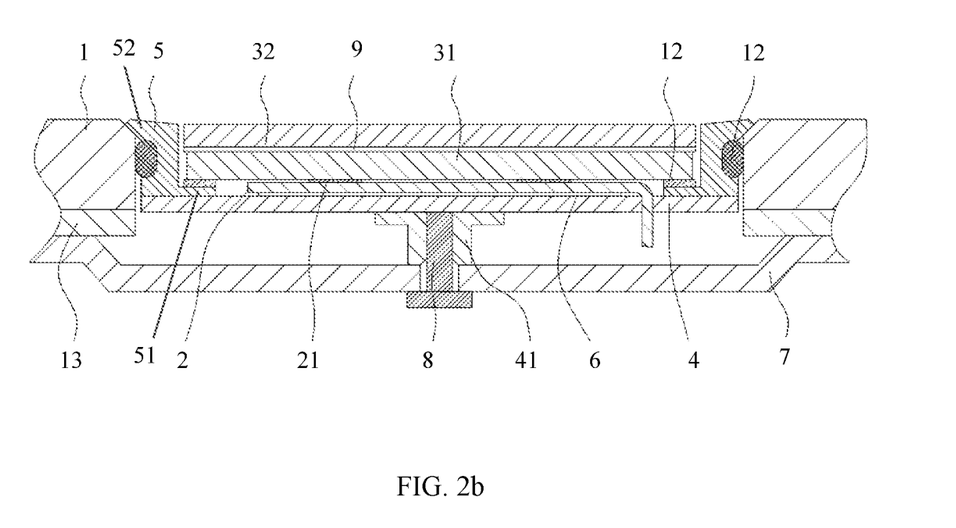
FIG. 2b is a schematic diagram of a second structure of the biometric module according to the first embodiment of this disclosure.

The ring-shaped outer skirt 52 is formed on the outer side wall of the decorative ring 5, a lower surface of the outer skirt 52 forms the second supporting surface, and the second supporting surface is used for being fixed with an edge region of the opening, which is positioned on the upper surface of the transparent cover plate 1. In the embodiment, the edge region of the upper surface of the transparent cover plate 1 is provided with a face matched with the second supporting surface, the second supporting surface can be a plane or an oblique plane, but the embodiment is not limited thereto. With reference to FIG. 2a and FIG. 2b, the second supporting surface is the oblique plane; and with reference to FIG. 3a and FIG. 3b, the second supporting surface is the plane.

The biological detection component includes a biometric sensor 31 and a protective cover plate 32. The protective cover plate 32 is fixed to the biometric sensor 31, and a material of the protective cover plate 32 can be glass, ceramic, sapphire and the like. The protective cover plate 32 can be fixed to the biometric sensor 31 by an adhesive layer 9, but the embodiment is not limited thereto.

In the embodiment, the biometric sensor 31 is installed on a first surface of the flexible circuit board 2, and the biometric sensor 31 is an ultrathin biosensor, has a thickness ranged from 90 to 350 μm and can be a fingerprint identification sensor, but the embodiment is not limited thereto.

Figure 3A:
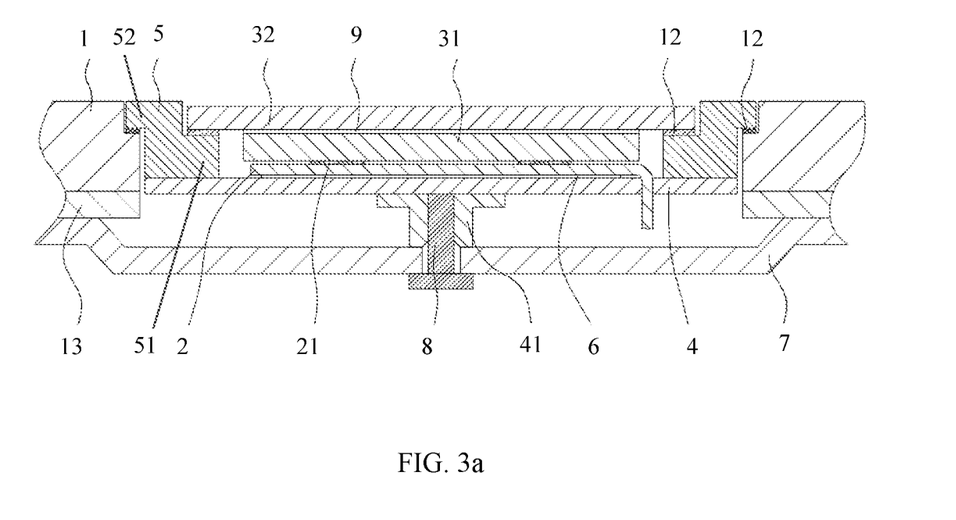
FIG. 3a is a schematic diagram of a third structure of the biometric module according to the first embodiment of this disclosure.
Figure 3B:
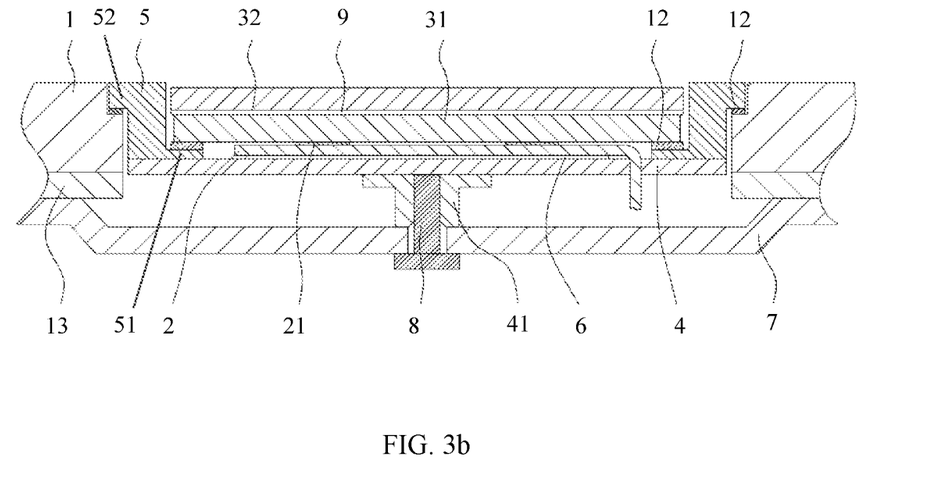
FIG. 3b is a schematic diagram of a fourth structure of the biometric module according to the first embodiment of this disclosure.

There are two fixing manners of the lower surface of the biological detection component and the first supporting surface: one fixing manner is that the lower surface of the protective cover plate 32 of the biological detection component is fixed with the first supporting surface, with reference to FIG. 2a and FIG. 3a; and the other fixing manner is that the lower surface of the biometric sensor 31 of the biological detection component is fixed with the first supporting surface, with reference to FIG. 2b and FIG. 3b.

Preferably, sealing rings 12 can also be arranged between the transparent cover plate 1 and the decorative ring 5 as well as between the decorative ring 5 and the biological detection component to form a waterproof structure, so that the mobile terminal has a waterproof function.

From the above, the embodiment provides four specific structures of the biometric module, as shown in FIG. 2a, FIG. 2b, FIG. 3a and FIG. 3b, respectively, and in the four specific structures, a fixing part 41 is installed on each stiffening plate 4. FIG. 2a shows a first structure of the biometric module, the edge of the upper surface of the transparent cover plate 1 is fixed with the lower surface (the second supporting surface) of the outer skirt 52, the second supporting surface is an oblique plane, and the lower surface of the protective cover plate 32 is fixed with the upper surface (the first supporting surface) of the inner skirt 51. FIG. 2b shows a second structure of the biometric module, the edge region of the upper surface of the transparent cover plate 1 is fixed with the lower surface (the second supporting surface) of the outer skirt 52, the second supporting surface is an oblique plane, and the lower surface of the biometric sensor 31 is fixed with the upper surface (the first supporting surface) of the inner skirt 51. FIG. 3a shows a third structure of the biometric module, the edge region of the upper surface of the transparent cover plate 1 is fixed with the lower surface (the second supporting surface) of the outer skirt 52, the second supporting surface is a plane, and the lower surface of the protective cover plate 32 is fixed with the upper surface (the first supporting surface) of the inner skirt 51. FIG. 3b shows a fourth structure of the biometric module, the edge region of the upper surface of the transparent cover plate 1 is fixed with the lower surface (the second supporting surface) of the outer skirt 52, the second supporting surface is a plane, and the lower surface of the biometric sensor 31 is fixed with the upper surface (the first supporting surface) of the inner skirt 51.

In the embodiment, when a finger presses the biometric module, the edge region of the upper surface of the transparent cover plate 1 is fixed with the lower surface (the second supporting surface) of the outer skirt 52, so that the biometric module can be limited to prevent interference to the display screen due to shifting of the biometric module. Moreover, the fixing part 41 is fixed with the positioning plate 7 by the screw 8, so that the biometric module can be more firmly fixed in the mobile terminal and the mobile terminal is firmer in structure.

The embodiment, compared to the existing art, provides the specific structures of the ultrathin biometric module and the assembling manners of fixing the biometric module to the mobile terminal, so that a certain reserved space can be reserved to be matched with the display screen with a large-sized display region for use, without interfering in space with a wire outlet end of the display screen.

A second embodiment of this disclosure relates to a biometric module, the embodiment is substantially the same as the first embodiment, and the main difference is that: in the first embodiment, the biometric module is fixed with the mobile terminal by the stiffening plate 4; and in the embodiment, with reference to FIG. 4a, FIG. 4b, FIG. 5a and FIG. 5b, the biometric module is fixed with the mobile terminal by the decorative ring 5.

In the embodiment, the lower surface of the decorative ring 5 is provided with at least two fixing parts 41 for being matched with the fixed structure of the mobile terminal so as to fix the biometric module with the mobile terminal. With reference to FIG. 5c, two fixing parts 41 are arranged in two symmetrical directions on the decorative ring 5, only occupy part of a space below the biological detection component and are assembled at positions where interference to the display screen cannot occur, but the embodiment does not make any limit thereto.

Particularly, two openings are formed in the positioning plate 7 of the case of the mobile terminal, the fixing part 41 is the nut, and the screw 8 passes through the positioning plate 7 and is locked with the nut, so that the positioning plate 7 and the decorative ring 5 can be fixed, thereby the biometric module is fixed with the mobile terminal.

It should be noted that in the embodiment, a hole also can be dug at the lower surface of the decorative ring 5 so as to form an internal screw thread as the fixing part 41, the screw 8 passes through the positioning plate 7 and is locked with the internal screw thread of the lower surface of the decorative ring 5, the positioning plate 7 and the decorative ring 5 can be fixed as well so as to fix the biometric module with the mobile terminal, but the embodiment does not make any limit thereto.

Figure 4A:
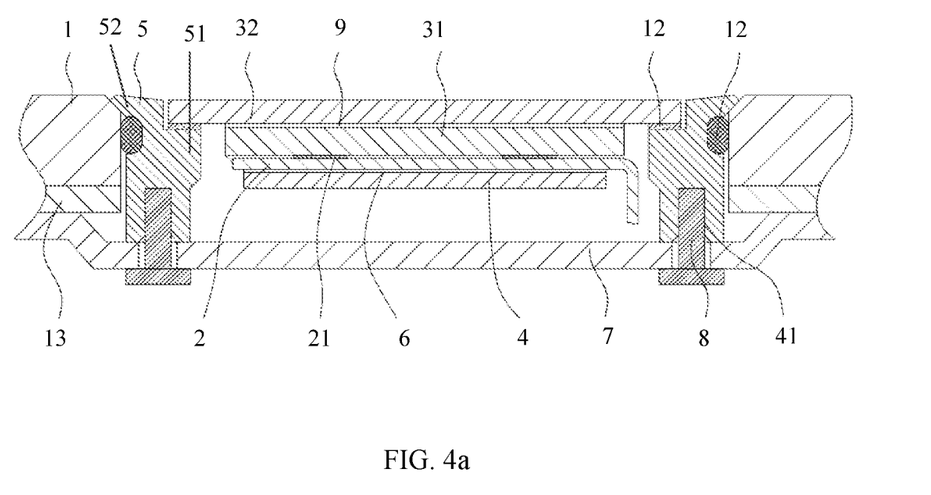
FIG. 4a is a schematic diagram of a first structure of a biometric module according to a second embodiment of this disclosure.
Figure 4B:
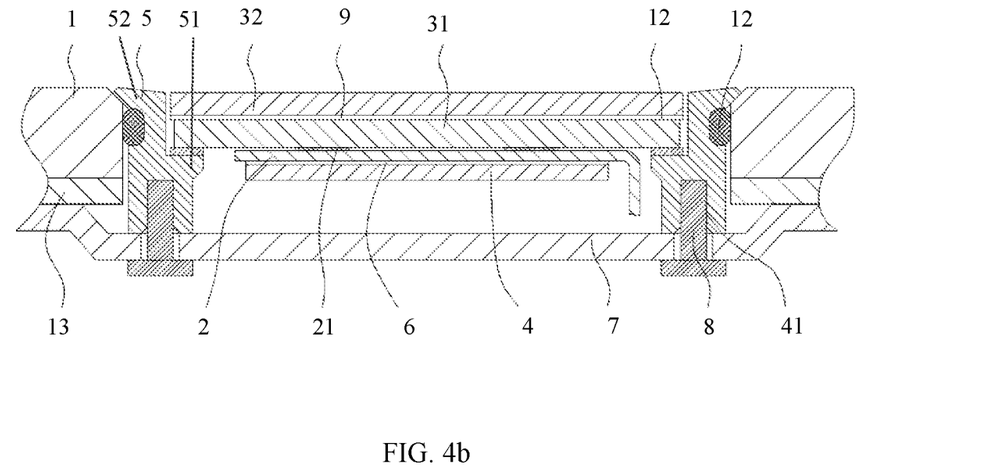
FIG. 4b is a schematic diagram of a second structure of the biometric module according to the second embodiment of this disclosure.
Figure 5A:
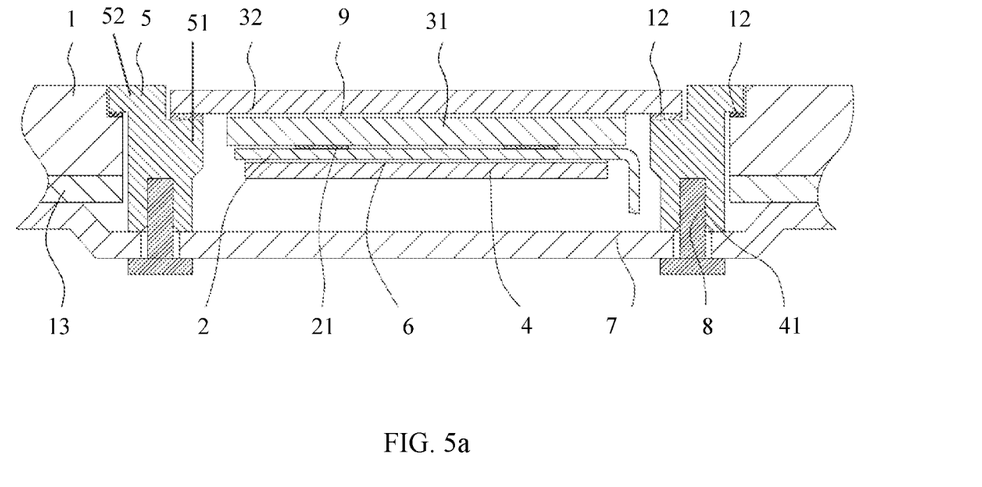
FIG. 5a is a schematic diagram of a third structure of the biometric module according to the second embodiment of this disclosure.
Figure 5B:
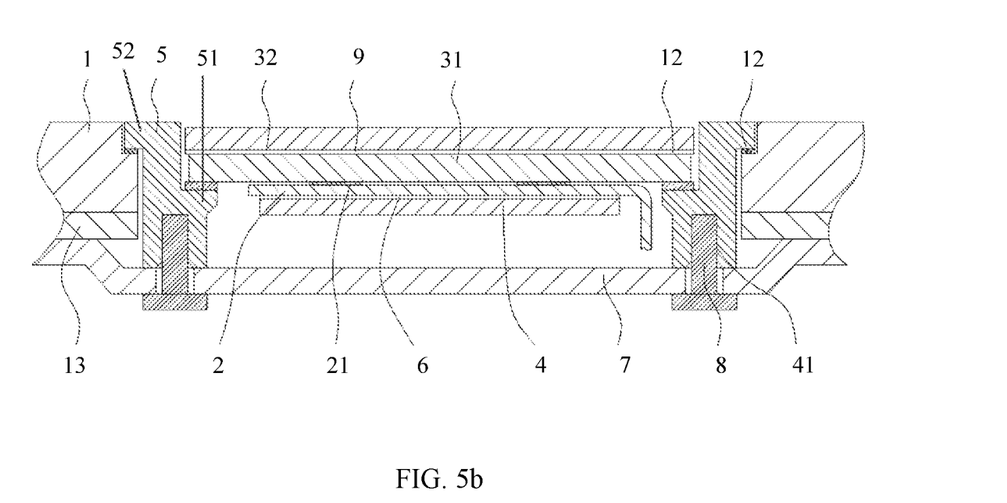
FIG. 5b is a schematic diagram of a fourth structure of the biometric module according to the second embodiment of this disclosure.
Figure 5C:
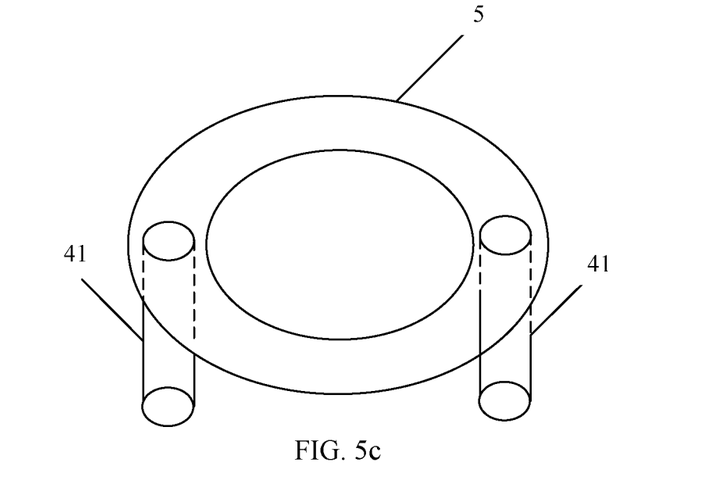
FIG. 5c is a schematic diagram that the lower surface of a decorative ring is provided with two fixing parts according to the second embodiment of this disclosure.

From the above, in the embodiment, four specific structures of the biometric module are provided, as shown in FIG. 4a, FIG. 4b, FIG. 5a and FIG. 5b, respectively, and in the four specific structures, the lower surface of the decorative ring 5 is provided with two fixing parts 41. FIG. 4a shows a first structure of the biometric module, the edge region of the upper surface of the transparent cover plate 1 is fixed with the lower surface (the second supporting surface) of the outer skirt 52, the second supporting surface is an oblique plane, and the lower surface of the protective cover plate 32 is fixed with the upper surface (the first supporting surface) of the inner skirt 51. FIG. 4b shows a second structure of the biometric module, the edge region of the upper surface of the transparent cover plate 1 is fixed with the lower surface (the second supporting surface) of the outer skirt 52, the second supporting surface is an oblique plane, and the lower surface of the biometric sensor 31 is fixed with the upper surface (the first supporting surface) of the inner skirt 51. FIG. 5a shows a third structure of the biometric module, the edge region of the upper surface of the transparent cover plate 1 is fixed with the lower surface (the second supporting surface) of the outer skirt 52, the second supporting surface is a plane, and the lower surface of the protective cover plate 32 is fixed with the upper surface (the first supporting surface) of the inner skirt 51. FIG. 5b shows a fourth structure of the biometric module, the edge region of the upper surface of the transparent cover plate 1 is fixed with the lower surface (the second supporting surface) of the outer skirt 52, the second supporting surface is a plane, and the lower surface of the biometric sensor 31 is fixed with the upper surface (the first supporting surface) of the inner skirt 51.

In the embodiment, when the finger presses the biometric module, the edge region of the upper surface of the transparent cover plate 1 is fixed with the lower surface (the second supporting surface) of the outer skirt 52, so that the biometric module can be limited to prevent interference to the display screen due to shifting of the biometric module; and moreover, the fixing part 41 is fixed with the positioning plate 7 by the screw 8, so that the biometric module can be more firmly fixed in the mobile terminal and the mobile terminal is firmer in structure.

The embodiment, with respect to the first embodiment, provides another manner of fixing the biometric module with the mobile terminal.

Figure 6A:
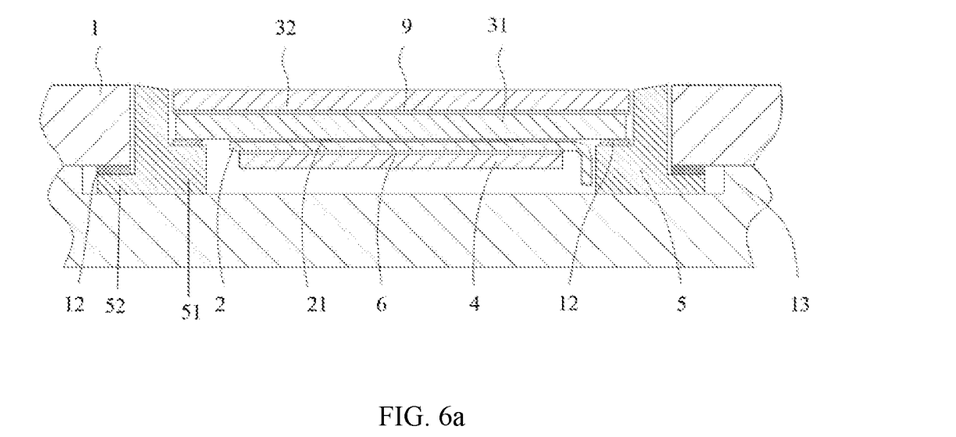
FIG. 6a is a schematic diagram of a first structure of a biometric module according to a third embodiment of this disclosure.
Figure 6B:
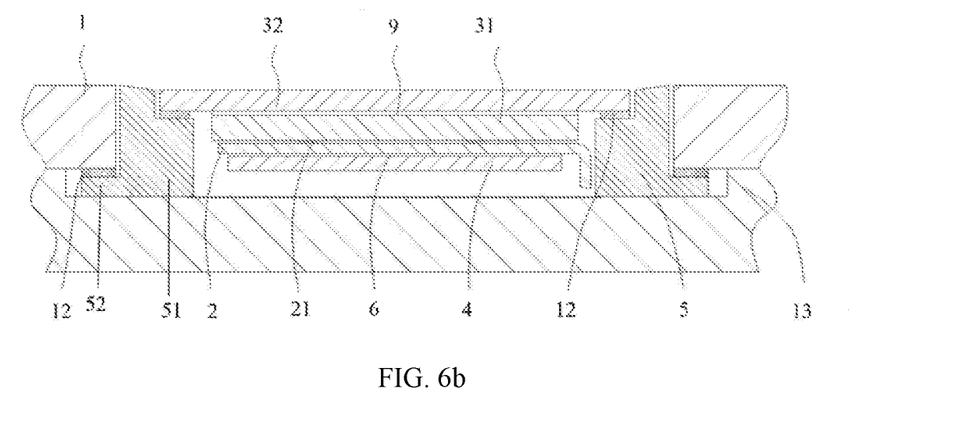
FIG. 6b is a schematic diagram of a second structure of the biometric module according to the third embodiment of this disclosure.

A third embodiment of this disclosure relates to a biometric module, the embodiment is substantially the same as the first embodiment, and the main difference is that: another fixing manner of the decorative ring 5 and the transparent cover plate 1 is provided.

In the embodiment, with reference to FIG. 6a and FIG. 6b, the outer skirt 52 is formed at the outer side wall of the decorative ring 5, the upper surface of the outer skirt 52 forms the second supporting surface, and the second supporting surface is used for being fixed with an edge region of the opening, which is positioned at the lower surface of the transparent cover plate 1; and the lower surface of the outer skirt 52 is used for being in contact with the shell of the mobile terminal.

Figure 6C:
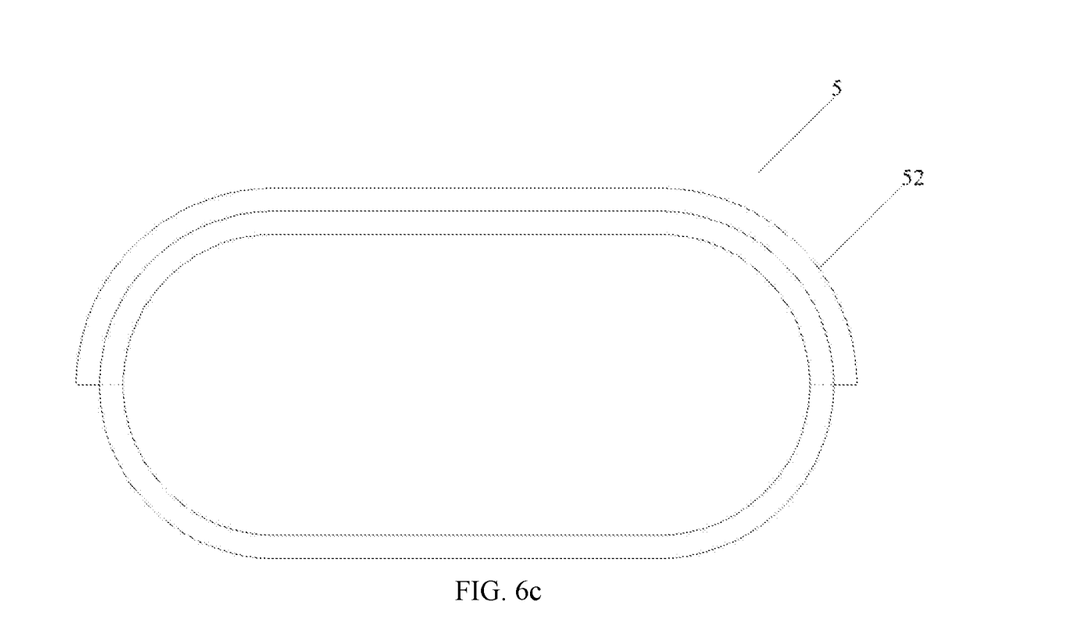
FIG. 6c is a top view of a decorative ring according to the third embodiment of this disclosure.

In the embodiment, the outer skirt 52 is formed at the outer side wall of the decorative ring 5. FIG. 6c shows a top view of the decorative ring 5. The side wall of the top half portion of the decorative ring 5 forms the outer skirt 52, the side wall of the bottom half portion of the decorative ring 5 forms a reserved space, but the embodiment does not make any limit thereto and can set according to the position of the reserved space required when the display screen is assembled.

From the above, in the embodiment, two specific structures of the biometric module are provided, as shown in FIG. 6a and FIG. 6b, respectively. Particularly, FIG. 6a shows a first structure of the biometric module, the edge region of the lower surface of the transparent cover plate 1 is fixed with the upper surface (the second supporting surface) of the outer skirt 52, the second supporting surface is a plane, and the lower surface of the protective cover plate 32 is fixed with the upper surface (the first supporting surface) of the inner skirt 51. FIG. 6b shows a second structure of the biometric module, the edge region of the lower surface of the transparent cover plate 1 is fixed with the upper surface (the second supporting surface) of the outer skirt 52, the second supporting surface is a plane, and the lower surface of the biometric sensor 31 is fixed with the upper surface (the first supporting surface) of the inner skirt 51.

In the embodiment, when the finger presses the biometric module, the lower surface of the decorative ring 5 is abutted against and fixed with the middle frame 13 of the mobile terminal, so that the biometric module can be limited to prevent interference to the display screen due to shifting of the biometric module. Moreover, the edge region of the lower surface of the transparent cover plate 1 is fixed with the upper surface (the second supporting surface) of the outer skirt 52, so that the biometric module can be prevented from falling out of the case of the mobile terminal; and namely, according to the embodiment, by matching of the transparent cover plate 1 and the middle frame 13 of the mobile terminal, the biometric module is more firmly fixed in the mobile terminal and the mobile terminal is firmer in structure.

The embodiment, with respect to the first embodiment, provides another fixing mode of the decorative ring and the transparent cover plate.

Figure 7A:
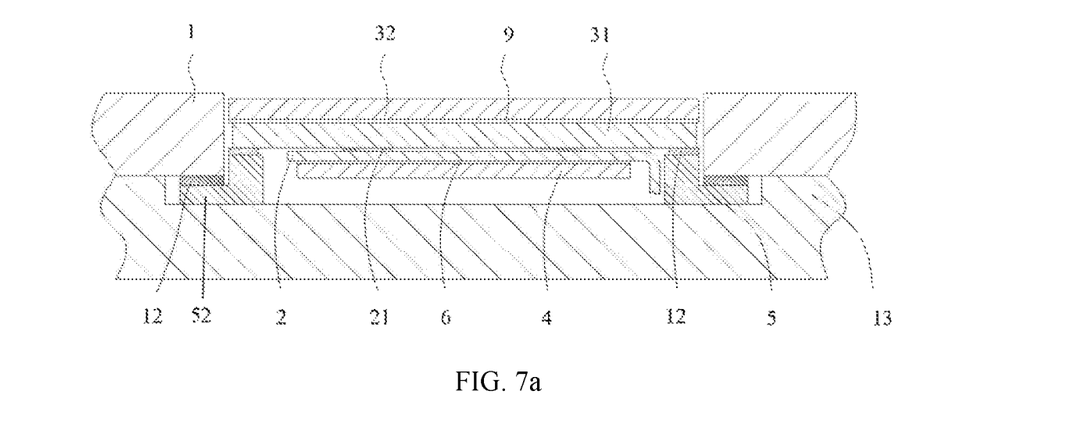
FIG. 7a is a schematic diagram of a first structure of a biometric module according to a fourth embodiment of this disclosure.
Figure 7B:
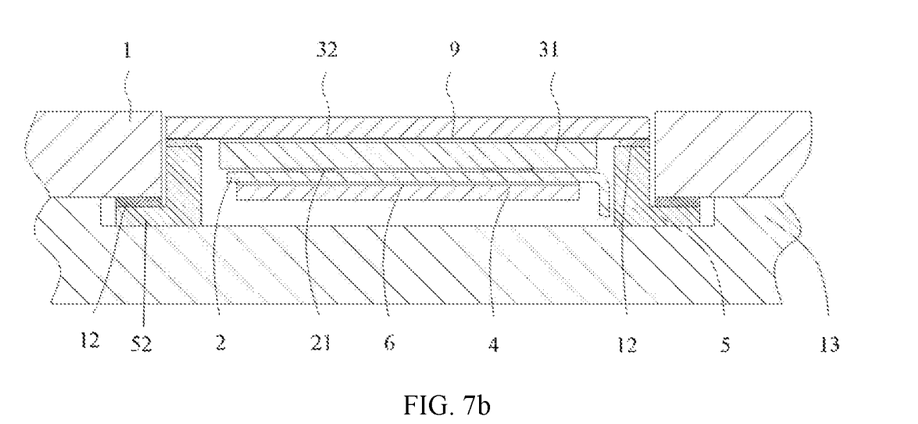
FIG. 7b is a schematic diagram of a second structure of the biometric module according to the fourth embodiment of this disclosure.

A fourth embodiment of this disclosure relates to a biometric module, the embodiment is substantially the same as the first embodiment, and the main difference is that: another structure of the decorative ring 5 is provided.

In the embodiment, with reference to FIG. 7a and FIG. 7b, the upper surface of the decorative ring 5 forms the first supporting surface, and the lower surface of the biological detection component is fixed with the first supporting surface. With reference to FIG. 3c, the outer skirt 52 can be formed on part of the outer side wall of the decorative ring 5, the upper surface of the outer skirt 52 forms the second supporting surface, and the second supporting surface is used for being fixed with the edge of the opening, which is positioned on the lower surface of the transparent cover plate 1.

Figure 7C:
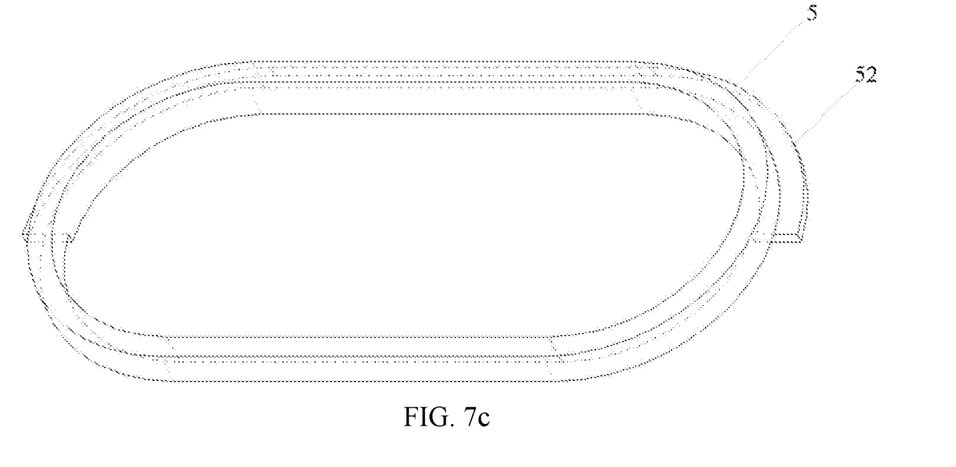
FIG. 7c is an oblique view of a decorative ring according to the fourth embodiment of this disclosure.

In the embodiment, the outer skirt 52 is formed on part of the outer side wall of the decorative ring 5, and with reference to FIG. 7c, FIG. 7c shows a oblique view of the decorative ring 5. The side wall of the top half portion of the decorative ring 5 forms the outer skirt 52, the side wall of the bottom half portion of the decorative ring 5 forms a reserved space, but the embodiment does not make any limit thereto and can set according to the position of the reserved space required when the display screen is assembled.

From the above, in the embodiment, two specific structures of the biometric module are provided, and respectively are as shown in FIG. 7a and FIG. 7b. FIG. 7a shows a first structure of the biometric module, the edge region of the lower surface of the transparent cover plate 1 is fixed with the upper surface (the second supporting surface) of the outer skirt 52, the second supporting surface is a plane, and the lower surface of the protective cover plate 32 is fixed with the upper surface (the first supporting surface) of the decorative ring 5. FIG. 7b shows a second structure of the biometric module, the edge region of the lower surface of the transparent cover plate 1 is fixed with the upper surface (the second supporting surface) of the outer skirt 52, the second supporting surface is a plane, and the lower surface of the biometric sensor 31 is fixed with the upper surface (the first supporting surface) of the decorative ring 5.

In the embodiment, when the finger presses the biometric module, the lower surface of the decorative ring 5 is abutted against and fixed with the middle frame 13 of the mobile terminal, so that the biometric module can be limited to prevent interference to the display screen due to shifting of the biometric module; moreover, the edge region of the lower surface of the transparent cover plate 1 is fixed with the upper surface (the second supporting surface) of the outer skirt 52, so that the biometric module can be prevented from falling out of the shell of the mobile terminal; and namely, according to the embodiment, by matching of the transparent cover plate 1 and the middle frame 13 of the mobile terminal, the biometric module is more firmly fixed in the mobile terminal and the mobile terminal is firmer in structure.

The embodiment, with respect to the first embodiment, provides another structure of a decorative ring as well as a fixing manner of the decorative ring and the transparent cover plate of the mobile terminal.

A fifth embodiment of this disclosure relates to a biometric module, applied to a mobile terminal including a transparent cover plate 1. The transparent cover plate 1 has an opening for accommodating the biometric module, the inner wall of the opening extends to form a supporting table. The transparent cover plate 1 is a display touch panel or a case of the mobile terminal. A thickness of the biometric module is smaller than or equal to a thickness of the transparent cover plate 1, and with reference to FIG. 8a and FIG. 8b, the biometric module includes a flexible circuit board 2, a biological detection component and a stiffening plate 4.

Figure 8A:
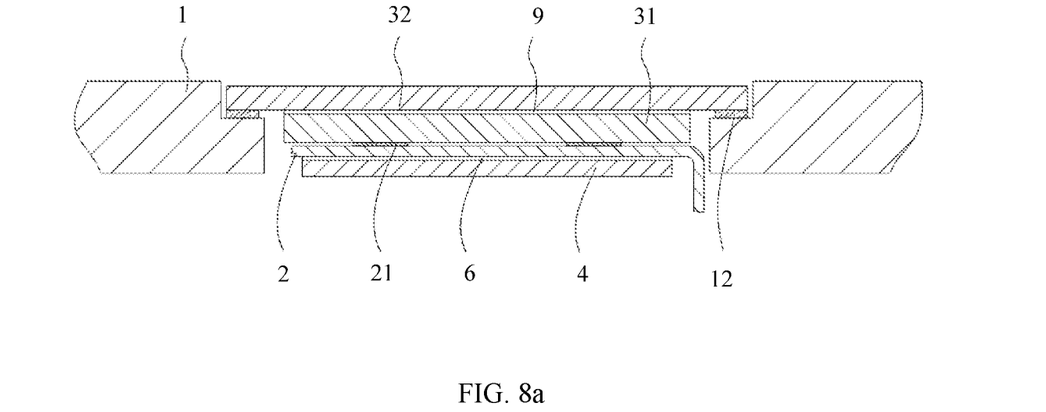
FIG. 8a is a schematic diagram of a first structure of a biometric module according to a fifth embodiment of this disclosure.
Figure 8B:
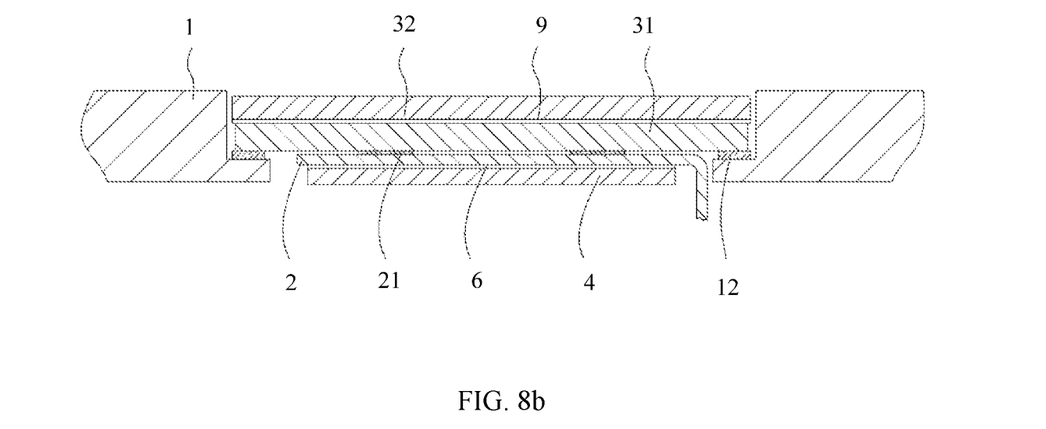
FIG. 8b is a schematic diagram of a second structure of the biometric module according to the fifth embodiment of this disclosure.

The biological detection component is installed on a first surface of the flexible circuit board 2, and fixed on the supporting table. The biological detection component can be installed on the first surface of the flexible circuit board 2 by soldering, in the drawings, the reference numeral 21 represents soldering, but the embodiment does not make any limit thereto.

The stiffening plate 4 is fixed on a second surface of the flexible circuit board 2, the stiffening plate 4 and the flexible circuit board 2 can be fixed by a conductive adhesive 6, but the embodiment does not make any limit thereto.

The biological detection component includes a biometric sensor 31 and a protective cover plate 32; the protective cover plate 32 is fixed to the biometric sensor 31, and a material of the protective cover plate 32 can be glass, ceramic, sapphire and the like; and the protective cover plate 32 can be fixed to the biometric sensor 31 by an adhesive layer 9, but the embodiment is not limited thereof.

In the embodiment, the biometric sensor 31 is installed on a first surface of the flexible circuit board 2, the biometric sensor 31 is an ultrathin biosensor, has a thickness range of 90 to 350 μm and can be a fingerprint identification sensor, but the embodiment is not limited thereto.

There are two manners of fixing the biological detection component on the supporting table: one manner is that the lower surface of the protective cover plate 32 of the biological detection component is fixed on the supporting table, with reference to FIG. 8*a*. The other manner is that the lower surface of the biometric sensor 31 of the biological detection component is fixed on the supporting table, with reference to FIG. 8*b*. The lower surface of the biological detection component can be fixed to the supporting table by the adhesive layer 9, but the embodiment does not make any limit thereto.

Preferably, a sealing ring 12 can also be arranged between the upper surface of the supporting table of the transparent cover plate 1 and the lower surface of the biological detection component to form a waterproof structure, so that the mobile terminal has a waterproof function.

From the above, in the embodiment, two specific structures of the biometric module are provided, as shown in FIG. 8*a* and FIG. 8*b*, respectively. FIG. 8*a* shows a first structure of the biometric module, the lower surface of the protective cover plate 32 is fixed on the supporting table of the transparent cover plate 1. FIG. 8*b* shows a second structure of the biometric module, and the lower surface of the biometric sensor 31 is fixed on the supporting table of the transparent cover plate 1.

In the embodiment, when the finger presses the biometric module, the supporting table of the transparent cover plate 1 is fixed with the biological detection component, so that the biometric module can be limited to prevent interference to the display screen due to shifting of the biometric module.

According to the embodiment, compared to the prior art, the biological detection component is directly fixed on the transparent cover plate of the mobile terminal, so that the biometric module with the thickness smaller than the thickness of the transparent cover plate of the mobile terminal can be assembled on the mobile terminal.

A sixth embodiment of this disclosure relates to a mobile terminal. The mobile terminal, for example, is a mobile phone, a tablet personal computer and the like. The mobile terminal includes a transparent cover plate 1 with an opening 11, a case 10, a display screen and the biometric module according to any one of the first embodiment to the fourth embodiment. The transparent cover plate 1, for example, is a touch screen, and the display screen, for example, is an OLED display screen, a touch and display region of the OLED display screen has a large size proportion, and the biometric module in the terminal needs to provide a certain reserved space for a wire outlet end of an OLED display screen module.

The biometric module is positioned in the opening 11, and the second supporting surface of the decorative ring 5 is fixed with an edge region of the opening 11; and the transparent cover plate 1 is fixed on the case 10.

Preferably, with reference to FIG. 2*a*, FIG. 2*b*, FIG. 3*a*, FIG. 3*b*, FIG. 4*a*, FIG. 4*b*, FIG. 5*a*, FIG. 5*b*, FIG. 6*a*, FIG. 6*b*, FIG. 7*a* and FIG. 7*b*, the mobile terminal further includes two sealing rings 12, one sealing ring 12 is clamped between the first supporting surface and the biological detection component; and the other sealing ring 12 is clamped between the second supporting surface and the edge region of the opening 11 (which is taken as an example in FIG. 2*a* to FIG. 7*b*), or the other sealing ring 12 is clamped between the decorative ring 5 and the inner wall of the opening 1, so that the waterproof structure can be formed, thereby enabling the mobile terminal to have the waterproof function.

In the embodiment, a material of the sealing ring 12 can be silicon rubber or can also be a waterproof adhesive tape or foam, but the embodiment does not make any limit thereto.

In addition, the sealing ring 12 can also be injection-molded on the decorative ring by silica gel, but the embodiment does not make any limit thereto.

The embodiment, compared to the existing art, provides a mobile terminal applying the biometric module. The biological detection component is fixed on the transparent cover plate of the mobile terminal by the decorative ring, so that the biometric module with the thickness smaller than the thickness of the transparent cover plate of the mobile terminal can be assembled on the mobile terminal.

A seventh embodiment of this disclosure relates to a mobile terminal which, for example, is a mobile phone, a tablet personal computer and the like. The mobile terminal includes a transparent cover plate 1 with an opening 11 and the biometric module according to the fifth embodiment.

In the embodiment, with reference to FIG. 8*a* and FIG. 8*b*, the inner wall of the opening 11 of the transparent cover plate 1 extends to form a supporting table, and the biological detection component is positioned in the opening 11 and fixed on the supporting table; particularly, the lower surface of the biological detection component is fixed with the upper surface of the supporting table.

Preferably, the mobile terminal further includes a sealing ring 12, the sealing ring is clamped between the lower surface of the biological detection component and the upper surface of the supporting table, so that a waterproof structure can be formed, thereby enabling the mobile terminal to have the waterproof function.

In the embodiment, a material of the sealing ring 12 can be silica gel or can also be a waterproof adhesive tape or foam, but the embodiment does not make any limit thereto.

The embodiment, compared to the existing art, provides the mobile terminal applying the biometric module. The biological detection component is directly fixed on the transparent cover plate of the mobile terminal, so that the biometric module with the thickness smaller than the thickness of the transparent cover plate of the mobile terminal can be assembled on the mobile terminal.

An eighth embodiment of this disclosure relates to a mobile terminal, the embodiment is an improvement based on the seventh embodiment, and the main improvement is that: in the eighth embodiment, the mobile terminal further includes an adhesive layer 9.

Figure 9:
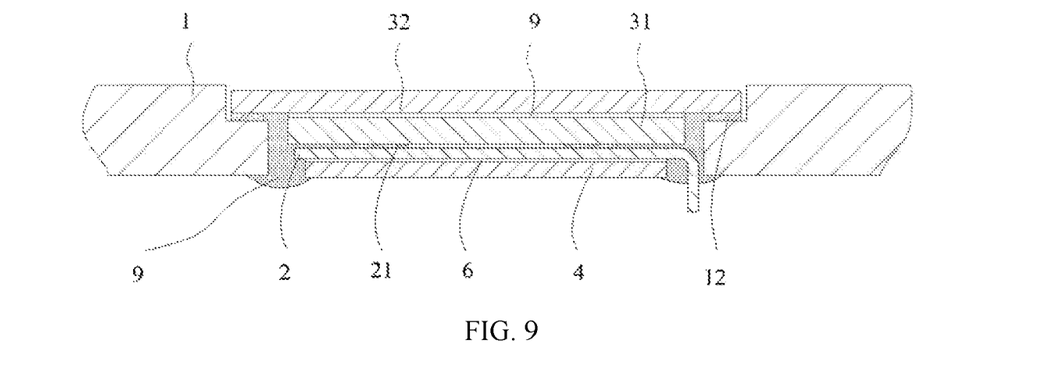
FIG. 9 is a sectional schematic diagram of a first structure of a mobile terminal according to an eighth embodiment of this disclosure.
Figure 10:
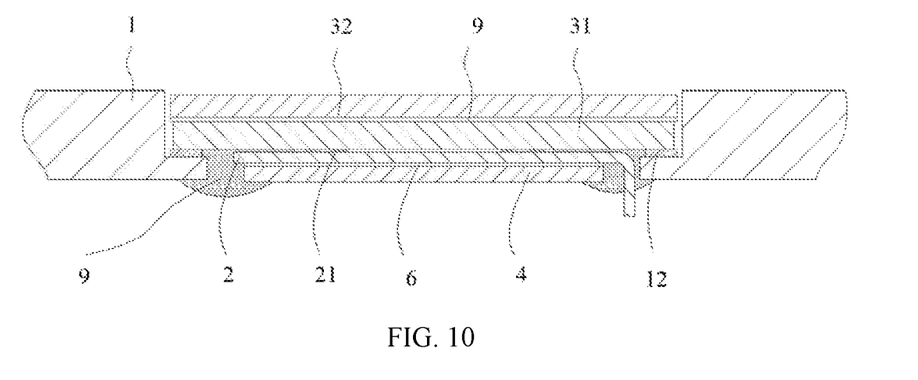
FIG. 10 is a sectional schematic diagram of a second structure of the mobile terminal according to the eighth embodiment of this disclosure.

With reference to FIG. 9 and FIG. 10, the adhesive layer 9 is filled in a gap between the supporting table and the biometric module.

In the embodiment, two structures of the mobile terminal are provided: FIG. 9 shows a first structure of the mobile terminal, and the lower surface of the protective cover plate 32 is fixed on the supporting table of the transparent cover plate 1. FIG. 10 shows a second structure of the mobile terminal, and the lower surface of the biometric sensor 31 is fixed on the supporting table of the transparent cover plate 1.

In the embodiment, when the finger presses the biometric module, the supporting table of the transparent cover plate 1 is fixed with the biological detection component, so that the biometric module can be limited to prevent interference to the display screen due to shifting of the biometric module. Moreover, the gap between the supporting table and the biometric module is filled with the adhesive layer 9, so that the biometric module can be more firmly fixed in the mobile terminal, and the mobile terminal is firmer in structure.

According to the embodiment, with respect to the seventh embodiment, the adhesive layer is arranged in the mobile terminal, so that the biometric module can be more reliably fixed in the mobile terminal.

Those skilled in the art can understand that each of the above-mentioned embodiments is the specific embodiment for implementing this disclosure, but in the practical disclosure, various changes can be made to the embodiments in form and in detail, without departure from the spirit and scope of this disclosure.

What is claimed is:

1. A biometric module, applied to a mobile terminal comprising a transparent cover plate, wherein the transparent cover plate has an opening for accommodating the biometric module;
   wherein the biometric module has a thickness smaller than or equal to a thickness of the transparent cover plate, and the biometric module comprises:
   a flexible circuit board,
   a biological detection component installed on a first surface of the flexible circuit board,
   a stiffening plate fixed on a second surface of the flexible circuit board, and
   a decorative ring arranged around the biological detection component;
   wherein the decorative ring has a first supporting surface, and the biological detection component is fixed on the first supporting surface; and
   the decorative ring further has a second supporting surface for being fixed with an edge region of the opening.

2. The biometric module according to claim 1, wherein a ring-shaped inner skirt is formed at an inner side wall of the decorative ring; and
   the upper surface of the inner skirt forms the first supporting surface, and a lower surface of the biological detection component is fixed with the first supporting surface.

3. The biometric module according to claim 2, wherein a ring-shaped outer skirt is formed at the outer side wall of the decorative ring; and
   a lower surface of the outer skirt forms the second supporting surface, and the second supporting surface is used for being fixed with an edge region of the opening, which is positioned corresponding to an upper surface of the transparent cover plate.

4. The biometric module according to claim 3, wherein a lower surface of the inner skirt is fixedly connected with the stiffening plate; and
   at least one fixing part for being matched with a fixed structure of the mobile terminal is installed on the stiffening plate so as to fix the biometric module to the mobile terminal.

5. The biometric module according to claim 3, wherein a lower surface of the decorative ring is provided with at least two fixing parts for being matched with the fixed structure of the mobile terminal so as to fix the biometric module to the mobile terminal.

6. The biometric module according to claim 2, wherein an outer skirt is formed at part of the outer side wall of the decorative ring;
   an upper surface of the outer skirt forms the second supporting surface, and the second supporting surface is used for being fixed with an edge region of the opening, which is positioned corresponding to the lower surface of the transparent cover plate; and
   the lower surface of the outer skirt is used for being in contact with a case of the mobile terminal.

7. The biometric module according to claim 1, wherein an upper surface of the decorative ring forms the first supporting surface, and a lower surface of the biometric module is fixed with the first supporting surface; and
   an outer skirt is formed at part of the outer side wall of the decorative ring, an upper surface of the outer skirt forms the second supporting surface, and the second supporting surface is used for being fixed with the edge region of the opening, which is positioned corresponding to a lower surface of the transparent cover plate.

8. The biometric module according to claim 1, wherein the second supporting surface is a plane or an oblique plane.

9. The biometric module according to claim 4, wherein the fixing part is a nut, and the fixed structure comprises:
   a positioning plate fixed to the case of the mobile terminal, and
   a screw which is used for passing through the positioning plate and locked to the nut.

10. The biometric module according to claim 9, wherein the biological detection component comprises a biometric sensor and a protective cover plate;
    the protective cover plate is fixed to the biometric sensor, and the biometric sensor is installed on a first surface of the flexible circuit board; and
    a lower surface of the protective cover plate is fixed with the first supporting surface, or a lower surface of the biometric sensor is fixed with the first supporting surface.

11. The biometric module according to claim 10, wherein the biometric sensor has a thickness ranged from 90 to 350 μm.

12. The biometric module according to claim 10, wherein the biometric sensor is a fingerprint identification sensor.

13. A biometric module, applied to a mobile terminal comprising a transparent cover plate, wherein the transparent cover plate has an opening for accommodating the biometric module, and an inner wall of the opening extends to form a supporting table;
    wherein the biometric module has a thickness smaller than or equal to a thickness of the transparent cover plate, and the biometric module comprises:
    a flexible circuit board, a biological detection component installed on a first surface of the flexible circuit board and a stiffening plate fixed on a second surface of the flexible circuit board;

wherein the biological detection component is fixed on the supporting table.

14. The biometric module according to claim 13, wherein the biological detection component comprises a biometric sensor and a protective cover plate;

the protective cover plate is fixed to the biometric sensor, and the biometric sensor is installed on the first surface of the flexible circuit board; and a lower surface of the protective cover plate is fixed on the supporting table, or a lower surface of the biometric sensor is fixed on the supporting table.

15. A mobile terminal, comprising a biometric module, a case and a transparent cover plate with an opening;

wherein the biometric module is positioned in the opening; and the transparent cover plate is fixed on the case;

wherein the biological identification module comprises a flexible circuit board, a biological detection component installed on a first surface of the flexible circuit board, a stiffening plate fixed on a second surface of the flexible circuit board and a decorative ring arranged around the biological detection component;

the decorative ring comprises a first supporting surface on which the biological detection component is fixed, and a second supporting surface for being fixed with an edge region of the opening; and wherein the biometric module has a thickness smaller than or equal to a thickness of the transparent cover plate.

16. The mobile terminal according to claim 15, wherein the mobile terminal further comprises two sealing rings;

one sealing ring is clamped between the first supporting surface and the biological detection component; and the other sealing ring is clamped between the second supporting surface and edge region of the opening, or the other sealing ring is clamped between the decorative ring and an inner wall of the opening.

* * * * *